United States Patent
Lim et al.

(10) Patent No.: US 9,992,731 B2
(45) Date of Patent: Jun. 5, 2018

(54) METHOD, APPARATUS AND SYSTEM FOR INFORMATION PUSH SERVICE BASED ON WIRELESS LAN ACCESS POINT

(75) Inventors: Byung-Soo Lim, Yongin-si (KR); Joon-Oo Kim, Suwon-si (KR); In-Young Shin, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 753 days.

(21) Appl. No.: 13/429,195

(22) Filed: Mar. 23, 2012

(65) Prior Publication Data
US 2012/0246247 A1    Sep. 27, 2012

(30) Foreign Application Priority Data
Mar. 23, 2011 (KR) .......... 10-2011-0025660

(51) Int. Cl.
*G06F 15/16* (2006.01)
*H04W 48/12* (2009.01)
*H04L 12/28* (2006.01)
*H04L 29/08* (2006.01)

(52) U.S. Cl.
CPC ......... *H04W 48/12* (2013.01); *H04L 12/2803* (2013.01); *H04L 67/26* (2013.01)

(58) Field of Classification Search
USPC .............................................. 709/222, 227
See application file for complete search history.

(56) References Cited

U.S. PATENT DOCUMENTS

| 5,109,484 A | * | 4/1992 | Hughes | G06F 9/4411 709/222 |
| 5,519,878 A | * | 5/1996 | Dolin, Jr. | H04L 12/2803 709/220 |
| 5,580,177 A | * | 12/1996 | Gase | G06F 3/1204 358/1.15 |

(Continued)

FOREIGN PATENT DOCUMENTS

| DE | WO 9216890 A1 * | 10/1992 | G06F 3/1297 |
| EP | 0952513 A1 * | 10/1999 | G06F 3/1204 |

(Continued)

OTHER PUBLICATIONS

Foreign Communication from Related Counterpart Application; Korean Patent Application No. 10-2011-0025660; Notice of Preliminary Rejection dated Mar. 21, 2017, 13 pages.

(Continued)

*Primary Examiner* — Alicia Baturay (57) ABSTRACT

A method for an information push service at a mobile station based on a wireless local area network (LAN) access point (AP). The method includes receiving a beacon message including a shortened Uniform Resource Locator (URL) from at least one AP, acquiring information based on the shortened URL included in the beacon message, and displaying the acquired information together with information included in the beacon message. The method allows a user to simply, conveniently, and easily acquire and make use of peripheral information of an area in which the user is located. The method also provides a service dependent on information on a position of contents, thereby being capable of allowing the user to easily access the contents.

20 Claims, 11 Drawing Sheets

(56) References Cited

U.S. PATENT DOCUMENTS

| | | | | |
|---|---|---|---|---|
| 5,613,160 A * | 3/1997 | Kraslavsky | G06F 3/1293 | 358/1.15 |
| 5,655,148 A * | 8/1997 | Richman | G06F 9/4411 | 710/11 |
| 5,668,992 A * | 9/1997 | Hammer | G06F 9/4411 | 713/1 |
| 5,687,320 A * | 11/1997 | Wiley | G06F 3/1293 | 707/999.01 |
| 5,692,111 A * | 11/1997 | Marbry | G06F 3/1297 | 358/1.15 |
| 5,809,329 A * | 9/1998 | Lichtman | G06F 15/177 | 710/15 |
| 5,832,191 A * | 11/1998 | Thorne | G06F 9/5011 | 358/1.1 |
| 5,960,167 A * | 9/1999 | Roberts | G06F 3/1294 | 358/1.15 |
| 5,980,078 A * | 11/1999 | Krivoshein | G05B 19/41865 | 700/1 |
| 6,021,429 A * | 2/2000 | Danknick | H04L 29/12009 | 709/208 |
| 6,091,508 A * | 7/2000 | Love | G06F 9/4411 | 358/1.1 |
| 6,112,256 A * | 8/2000 | Goffinet | G06F 3/1297 | 709/221 |
| 6,167,567 A * | 12/2000 | Chiles | G06F 9/4448 | 709/221 |
| 6,178,468 B1 * | 1/2001 | Rudd | G06F 9/4413 | 707/999.1 |
| 6,219,700 B1 * | 4/2001 | Chang | H04L 41/044 | 709/222 |
| 6,269,481 B1 * | 7/2001 | Perlman | G06F 9/4415 | 707/999.1 |
| 6,301,012 B1 * | 10/2001 | White | G06F 3/1204 | 358/1.15 |
| 6,308,205 B1 * | 10/2001 | Carcerano | H04L 41/0253 | 709/220 |
| 6,349,304 B1 * | 2/2002 | Boldt | G06F 3/1204 | |
| 6,362,894 B1 * | 3/2002 | Shima | G06F 3/1293 | 358/1.12 |
| 6,457,069 B1 * | 9/2002 | Stanley | G06F 9/4411 | 326/105 |
| 6,466,971 B1 * | 10/2002 | Humpleman | H04L 12/2803 | 709/203 |
| 6,493,751 B1 * | 12/2002 | Tate | H04L 41/0843 | 370/254 |
| 6,542,892 B1 * | 4/2003 | Cantwell | G06F 9/4411 | |
| 6,542,928 B1 * | 4/2003 | Hammons | H04L 12/24 | 709/221 |
| 6,557,049 B1 * | 4/2003 | Maloy | G06F 1/181 | 709/221 |
| 6,564,337 B1 * | 5/2003 | Yoneda | H04L 69/16 | 714/4.1 |
| 6,577,907 B1 * | 6/2003 | Czyszczewski | H04N 1/00416 | 358/442 |
| 6,687,733 B2 * | 2/2004 | Manukyan | G06F 9/44505 | 709/200 |
| 6,693,722 B1 * | 2/2004 | Mixer, Jr. | G06K 15/00 | 358/1.13 |
| 6,728,346 B2 * | 4/2004 | Czyszczewski | G06F 21/31 | 379/93.02 |
| 6,738,027 B1 * | 5/2004 | Doolittle | G06F 3/1446 | 345/1.1 |
| 6,779,004 B1 * | 8/2004 | Zintel | H04L 12/2803 | 709/227 |
| 6,789,111 B1 * | 9/2004 | Brockway | G06F 9/4411 | 709/203 |
| 6,809,830 B1 * | 10/2004 | Lafky | G06F 3/1204 | 358/1.13 |
| 6,810,420 B1 * | 10/2004 | Buse | H04L 29/12254 | 709/220 |
| 6,814,510 B1 * | 11/2004 | Sabbagh | G06F 3/1204 | 400/61 |
| 6,842,766 B2 * | 1/2005 | Brockway | G06F 9/4411 | 709/203 |
| 6,859,827 B2 * | 2/2005 | Banginwar | H04L 41/12 | 709/203 |
| 6,867,876 B1 * | 3/2005 | Czyszczewski | H04N 1/00204 | 358/1.13 |
| 6,892,230 B1 * | 5/2005 | Gu | H04L 12/2805 | 370/254 |
| 6,892,299 B2 * | 5/2005 | Abe | G06F 9/4411 | 709/200 |
| 6,910,064 B1 * | 6/2005 | Astarabadi | H04L 29/06 | 709/203 |
| 6,910,068 B2 * | 6/2005 | Zintel et al. | | 709/220 |
| 6,915,337 B1 * | 7/2005 | Motoyama | G06F 9/4411 | 709/220 |
| 6,915,514 B1 * | 7/2005 | Machida | G06F 9/4411 | 717/168 |
| 6,920,506 B2 * | 7/2005 | Barnard | H04L 29/12113 | 709/223 |
| 6,941,356 B2 * | 9/2005 | Meyerson | H04L 41/0809 | 370/254 |
| 6,961,336 B2 * | 11/2005 | Coggeshall | H04L 29/12018 | 370/218 |
| 6,963,417 B1 * | 11/2005 | Saito | H04N 1/00214 | 358/1.15 |
| 6,970,920 B2 * | 11/2005 | Poirier | H04L 29/06 | 709/217 |
| 8,260,320 B2 * | 9/2012 | Herz | | 455/456.3 |
| 8,281,232 B2 * | 10/2012 | Vishria et al. | | 715/208 |
| 8,553,849 B2 * | 10/2013 | Michaelis | H04M 3/42391 | 379/52 |
| 2002/0101620 A1 * | 8/2002 | Sharif | H04N 1/00209 | 358/400 |
| 2003/0016393 A1 * | 1/2003 | Johnson | H04N 1/00209 | 358/402 |
| 2003/0018746 A1 * | 1/2003 | Boesch | G06F 8/63 | 709/218 |
| 2003/0110270 A1 * | 6/2003 | Copp | H04N 1/00204 | 709/228 |
| 2003/0160988 A1 * | 8/2003 | Chapin | G06F 3/1204 | 358/1.13 |
| 2003/0160989 A1 * | 8/2003 | Chapin | G06F 9/4411 | 358/1.13 |
| 2003/0195952 A1 * | 10/2003 | Henry | H04L 29/06 | 709/220 |
| 2003/0200265 A1 * | 10/2003 | Henry | H04N 1/00204 | 709/206 |
| 2003/0217282 A1 * | 11/2003 | Henry | H04L 63/102 | 726/4 |
| 2003/0221190 A1 * | 11/2003 | Deshpande | G06F 8/61 | 717/171 |
| 2004/0043758 A1 | 3/2004 | Sorvari et al. | | |
| 2004/0076159 A1 * | 4/2004 | Utsubo | G06F 3/121 | 370/392 |
| 2005/0132028 A1 * | 6/2005 | Lester | G06K 15/00 | 709/222 |
| 2005/0198267 A1 * | 9/2005 | Parks | H04L 67/16 | 709/224 |
| 2007/0141984 A1 | 6/2007 | Kuehnel et al. | | |
| 2007/0242643 A1 * | 10/2007 | Chandra | H04H 20/61 | 370/338 |
| 2007/0255834 A1 * | 11/2007 | Abhishek | H04W 36/0055 | 709/226 |
| 2008/0117852 A1 | 5/2008 | Bennett et al. | | |
| 2010/0120450 A1 | 5/2010 | Herz | | |
| 2010/0302995 A1 * | 12/2010 | Morioka | H04L 12/4625 | 370/315 |
| 2011/0116398 A1 * | 5/2011 | Nakahara | H04W 52/0216 | 370/252 |
| 2011/0314192 A1 * | 12/2011 | Ahn | H04L 12/2809 | 710/63 |

FOREIGN PATENT DOCUMENTS

| | | | | |
|---|---|---|---|---|
| EP | 0965915 A2 * | 12/1999 | | G06F 9/4413 |
| EP | GB 2351374 A * | 12/2000 | | G06F 9/4411 |

(56) References Cited

FOREIGN PATENT DOCUMENTS

| | | |
|---|---|---|
| JP | 2008-219550 | 9/2008 |
| KR | 10-2004-0069574 | 8/2004 |
| KR | 20050057024 A | 6/2005 |
| KR | 10-2006-0102181 | 9/2006 |
| KR | 20080085144 A | 9/2008 |

OTHER PUBLICATIONS

Foreign Communication from Related Counterpart Application; Korean Patent Application No. 10-2011-0025660; Korean Notice of Final Rejection dated Sep. 26, 2017; 6 pages.
Notice of Final Rejection dated Nov. 7, 2017 in connection with Korean Patent Application No. 10-2011-0025660.

* cited by examiner

METHOD, APPARATUS AND SYSTEM FOR INFORMATION PUSH SERVICE BASED ON WIRELESS LAN ACCESS POINT

CROSS-REFERENCE TO RELATED APPLICATION(S) AND CLAIM OF PRIORITY

The present application claims priority under 35 U.S.C. § 119 to a Korean patent application filed in the Korean Intellectual Property Office on Mar. 23, 2011 and assigned Serial No. 10-2011-0025660, the contents of which is herein incorporated by reference.

TECHNICAL FIELD OF THE INVENTION

The present invention relates to a wireless Local Area Network (LAN). More particularly, the present invention relates to a method, an apparatus and a system for an information push service based on a wireless LAN Access Point (AP).

BACKGROUND OF THE INVENTION

A wireless LAN service refers to a service for providing communication by constructing a network environment from an access point (AP) to each of one or more mobile stations (MSs) using wireless signals instead of using a wired cable. The wireless LAN service can compensate for network construction vulnerability of existing communication technologies. Existing mobile communication networks are advantageous with respect to mobility and transmission coverage, but the communication speed of typical mobile communication networks is inferior to a wired network. Bluetooth is a specific wireless technology that is very useful within a space of several meters centering on a user's working space, but is typically inferior for mobility or coverage. Conversely, a wired network has excellent communication speed performance, but does not provide assurance for mobility because physical LAN cabling is essential.

In comparison between a wireless LAN service and other communication technologies as above, a wireless LAN is excellent for mobility compared to a wired network and exhibits fast communication speeds compared to a mobile communication network, and may cover a relatively wider area than Bluetooth. Accordingly, due to these merits, the wireless LAN service is being widely used by Internet users, and its related technology is also the focus of recent development.

In the wireless LAN service, an AP is installed in a nationwide service area such that a user may wireless access the AP using a client (i.e., a client terminal), and each AP provides a wireless LAN service and connects to an authentication server for authenticating the user. The user accesses an AP installed in a wireless LAN service area using a Personal Digital Assistant (PDA), a notebook computer, and the like, and uses the Internet through an authentication procedure of the authentication server. Also, the AP may be also a wireless Internet Protocol (IP) sharing device that a user installs in a home.

In the general wireless LAN service, an AP is installed in a service area and sends a wireless signal to induce an access of a client terminal. If there is an access request from the client terminal, the AP just plays an access point role with the client terminal of accepting the request, and does not perform a function making the most of a regional characteristic of the AP.

That is, the AP is installed in the specific service area and plays an access point role of allowing a user who has moved to the specific service area to use the Internet in the specific service area. However, the general wireless LAN service could not provide a service using the regional characteristic of the AP besides using the AP for playing the access point role for communication.

Peripheral devices (e.g., a printer, a home electronic device, an Internet gateway, and the like) (hereinafter, referred to as 'Universal Plug and Play (UPnP) devices') connect to an AP by means of a UPnP function, but there is an inconvenience that a user has to execute Web browsing in order for the user to identify information on the UPnP devices connected to the AP.

Accordingly, there is a need for a method, an apparatus and a system for pushing information taking a regional characteristic of a wireless LAN AP into consideration or information on a UPnP device connecting to the AP.

SUMMARY OF THE INVENTION

To address the above-discussed deficiencies of the prior art, it is a primary aspect of the present invention to solve at least the above-mentioned problems and/or disadvantages and to provide at least the advantages described below. Accordingly, an aspect of the present invention is to provide a method, an apparatus and a system for an information push service based on a wireless Local Area Network (LAN) Access Point (AP).

According to one aspect of the present invention, a method for an information push service at a mobile station based on a wireless LAN AP is provided. The method includes receiving a beacon message including a shortened Uniform Resource Locator (URL) from at least one AP. The method also includes acquiring information, based on the shortened URL included in the beacon message, and displaying the acquired information together with information included in the beacon message.

According to another aspect of the present invention, a method of an AP operation for an information push service based on a wireless LAN AP is provided. The method includes generating a beacon message including a URL, and transmitting the beacon message including the URL.

According to a further aspect of the present invention, a method of Universal Plug and Play (UPnP) device operation for an information push service based on a wireless LAN AP is provided. The method includes transmitting a URL of a UPnP device eXtensible Mark-up Language (XML) description to the AP. The method also includes transmitting the UPnP device XML description to the AP, based on the URL of the UPnP device XML description.

According to yet another aspect of the present invention, an MS apparatus for an information push service based on a wireless LAN AP is provided. The apparatus includes a receiver, a controller, and a display unit. The receiver is configured to receive a beacon message including a shortened URL from at least one AP. The controller is configured to acquire information based on the shortened URL included in the beacon message. The display unit is configured to display the acquired information together with information included in the beacon message.

According to still another aspect of the present invention, an AP for an information push service based on a wireless LAN AP is provided. The AP includes a controller configured to generate a beacon message including a URL, and transmit the beacon message including the URL.

According to still another aspect of the present invention, a UPnP device for an information push service based on a wireless LAN AP is provided. The UPnP device includes a controller configured to transmit a URL of a UPnP device XML description to the AP, and transmit the UPnP device XML description to the AP based on the URL of the UPnP device XML description.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

FIGS. 1 through 9, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged communication system.

Preferred embodiments of the present invention will be described herein below with reference to the accompanying drawings. In the following description, well-known functions or constructions are not described in detail since they would obscure the invention in unnecessary detail. Terms described below, which are defined considering functions in the present invention, may be different depending on user and operator's intention or practice. Therefore, the terms should be defined on the basis of the disclosure throughout this specification.

Exemplary embodiments of the present invention provide a method, an apparatus and a system for an information push service based on a wireless Local Area Network (LAN) Access Point (AP).

Figure 1:
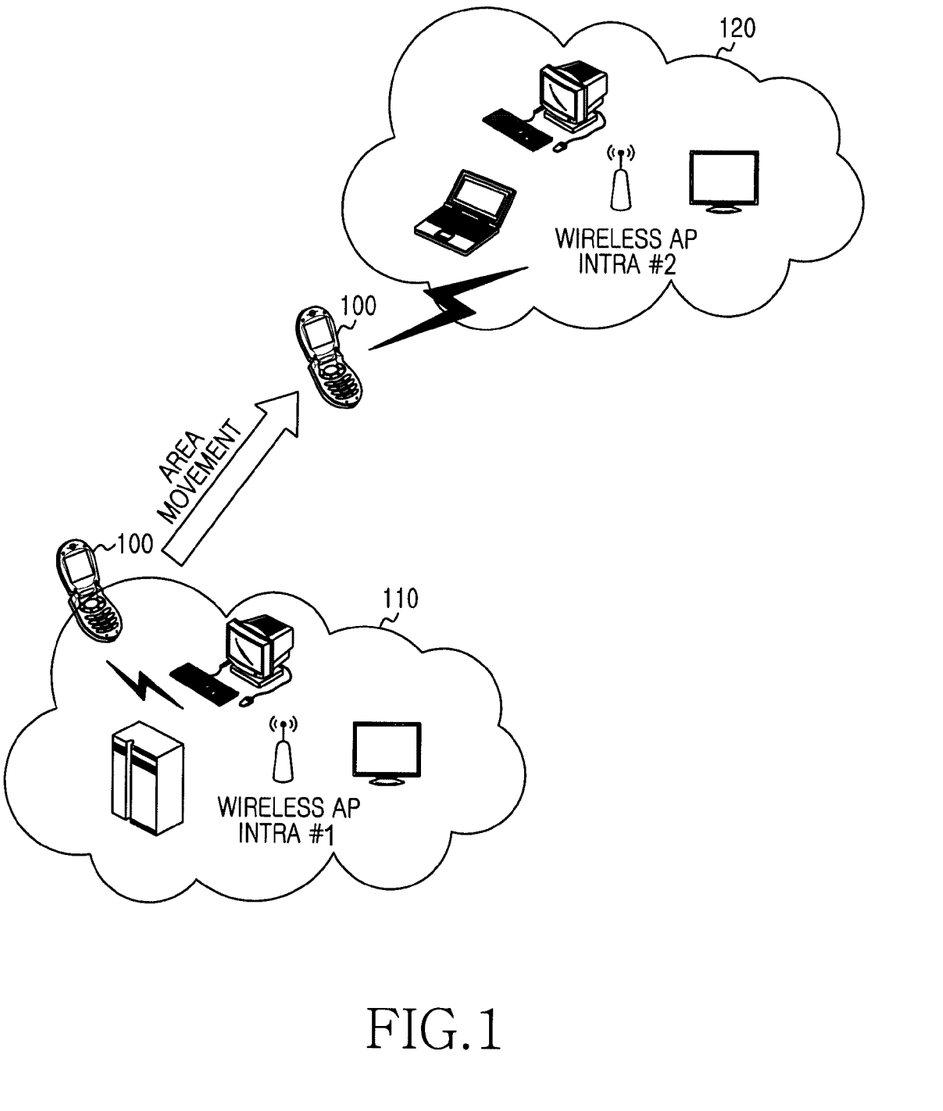
FIG. 1 is a diagram illustrating a wireless Local Area Network (LAN) infrastructure according to a first embodiment of the present invention.

FIG. 1 illustrates a wireless LAN infrastructure according to a first embodiment of the present invention.

Referring to FIG. 1, a client terminal 100 (e.g., a Personal Digital Assistant (PDA)), a smart phone, a notebook computer, and the like) equipped with a wireless LAN card may use the Internet by means of a first wireless LAN AP 110 or a second wireless LAN AP 120.

At least one of the first AP 110 and the second AP 120 (which are equipment in a wireless LAN network) is a device for connecting the wireless LAN with a wired LAN. The first AP 110 or the second AP 120, an independent type equipment, connects to an Ethernet hub or server to not only play a relay role of enabling communication between client terminals but also allow the client terminal 100 to connect with an external network.

The first AP 110 or the second AP 120 each provides a Universal Plug and Play (UPnP) service. For example, based on a plug and play manner, an intelligent home electronic device, a printer, an Internet gateway, and the like (hereinafter, referred to as a 'UPnP device') may easily connect to the first AP 110 or the second AP 120. The intelligent home electronic device, the printer, the Internet gateway, and the like connect to the first AP 110 or the second AP 120, acquire an Internet Protocol (IP) address, forward their own capabilities, and recognize the existence and capabilities of other devices. The first AP 110 or the second AP 120 each receives device information and the like during periods when the UPnP devices connect to the access points and store the device information. According to implementation, the first AP 110 or the second AP 120 each may send an information request message to the UPnP devices, connect to the UPnP devices, and receive device information and the like.

For another example, a Digital Living Network Alliance (DLNA) system may be further constructed by connecting a Digital Media Controller (DMC), a Digital Media Server (DMS), a Digital Media Renderer (DMR) and the like to the first AP 110 or the second AP 120. The DLNA system may allow users to freely share media contents of a music, a photograph, a video and the like through a home network. In the DLNA system, the DMC pushes or controls the contents of the DMS. In the DLNA system, the DMS plays a server role of storing contents. The DMR plays a role of playing the contents of the DMS.

In the present invention, if the client terminal 100 gets out of the coverage of the first AP 110 and moves to a service area of the second AP 120, the client terminal 100 may receive, by a push service, information on a UPnP device stored in the second AP 120 through a beacon message periodically broadcasted from the second AP 120. A procedure of receiving, by the push service, the information on the UPnP device stored in the second AP 120 is described in FIG. 3.

FIG. 1 illustrates an embodiment in which each AP stores information on a UPnP device. According to another implementation, information on each AP area may be stored and managed in a separate server.

Figure 2:
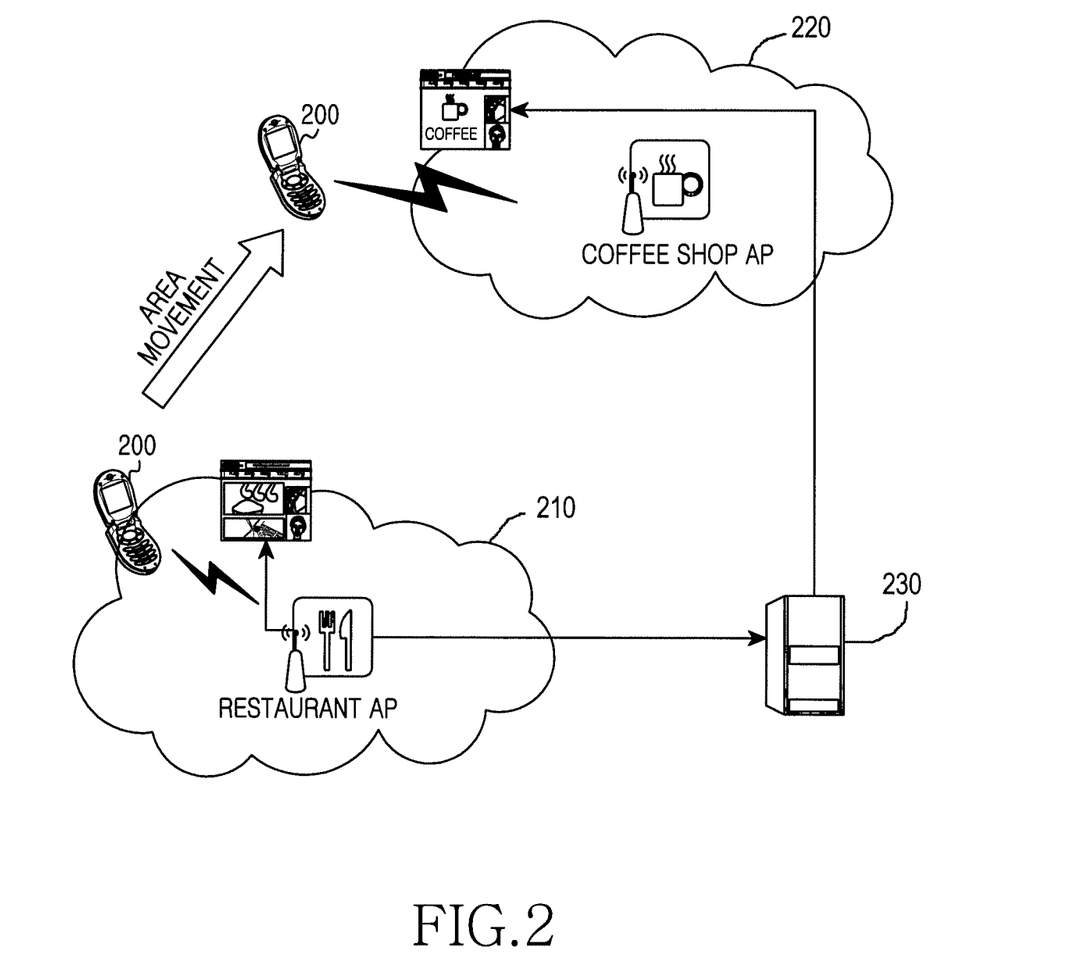
FIG. 2 is a diagram illustrating a wireless LAN infrastructure according to a second embodiment of the present invention.

FIG. 2 illustrates a wireless LAN infrastructure according to a second embodiment of the present invention.

Referring to FIG. 2, a first intra wireless LAN AP 210 is a wireless IP sharing device installed in a restaurant, and a second intra wireless LAN AP 220 is a wireless IP sharing device installed in a coffee shop. Information on the first AP 210 (e.g., restaurant name, address, today's special menu, and the like) is stored in a server 230. Likewise, information on the second AP 220 (e.g., coffee shop name, address, today's special menu, and the like) is stored in the server 230. The information on the first AP and the information on the second AP are linked to corresponding Uniform Resource Locators (URLs), respectively.

First, the client terminal 200 accesses the first AP 210 installed in the restaurant by way of an initial connection setup procedure (e.g., the IEEE 802.11 standard). The client terminal 200 receives a URL linked with the information on the first AP 210 through a beacon message periodically transmitted from the first AP 210. After that, the client terminal 200 acquires the information on the first AP 210 stored in the server 230, based on the URL linked with the information on the first AP 210.

After that, when moving from the first AP 210 to the second AP 220, the client terminal 200 acquires a URL linked with the information on the second AP 220 through a beacon message periodically broadcasted from the second AP 220. After that, through the acquired URL information, the client terminal 200 acquires the information on the second AP 220 stored in the server 230. In other words, the client terminal 200 automatically receives the information on the second AP 220 (hereinafter, referred to as a 'push service').

Figure 3:
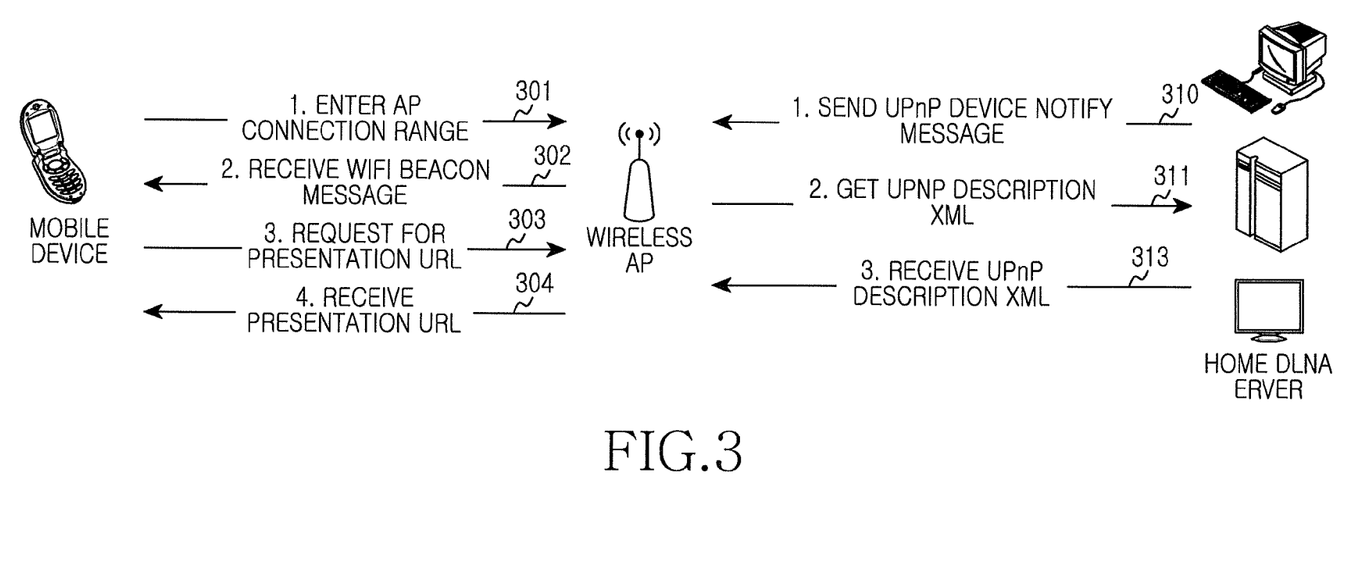
FIG. 3 is a diagram illustrating a procedure for an information push service based on a wireless LAN Access Point (AP) according to an embodiment of the present invention.

FIG. 3 illustrates a procedure for an information push service based on a wireless LAN AP according to an embodiment of the present invention.

Referring to FIG. 3, if a mobile device performing a wireless LAN function enters AP connection coverage in operation 301, the mobile device receives a beacon message broadcasted from a wireless AP in operation 302. The standard beacon message includes a beacon interval, a timestamp, a Service Set IDentifier (SSID), supported rates, parameter sets, capability information, and a Traffic Indication Map (TIM) and, according to the present invention, further includes a presentation URL. The presentation URL is a URL linked with information on a corresponding AP area or is a URL linked with information on a UPnP device connecting to a corresponding AP.

That is, the mobile device sends an HTTP Get command to a presentation server within the wireless AP to receive, in an XML form below, a page for a UPnP device from the presentation URL. By parsing a '<state>' tag portion among these, the mobile device may identify device state information in advance.

```
<?xml version="1.0" encoding="utf-8" ?>
- <root xmlns="urn:schemas-upnp-org:device-1-0" xmlns.dlna=
"urn:schemas-dlna-org:device-1-0" xmlns:sec="http://www.sec.co.kr">
  - <device>
  <deviceType>urn:schemas-upnp-org:device:MediaServer:1
  </deviceType>
  <friendlyName>[PC] AllShare</friendlyName>
  <manufacturer>Samsung Electronics Co., Ltd</manufacturer>
  <manufacturerURL>http://www.samsung.com/sec</manufacturerURL>
  <modelDescription>Samsung     AllShare     PC     S/W
Server</modelDescription>
  <modelName>Samsung AllShare PC S/W Server</modelName>
  <modelNumber>2.0</modelNumber>
  <modelURL>http://www.samsung.com/sec</modelURL>
  <UDN>uuid:11490c80-002c-1000-8823-001377cf6a94</UDN>
  </device>
  - <state>
  <totalItem>234</totalItem>
  <audioItem>100</audioItem>
  <videoItem>34</videoItem>
  <photoItem>80</photoItem>
  <etcItem>20</etcItem>
  <changedItem>8</changedItem>
  <newItem>8</newItem>
  <recentlyUpdated>12</recentlyUpdated>
  </state>
  </root>
```

After that, in operation 303, the mobile device sends the wireless AP a request for information on a corresponding AP area or information on a UPnP device connecting to the corresponding AP, using the presentation URL included in the beacon message. In operation 304, the mobile device receives the information on the corresponding AP area or the information on the UPnP device connecting to the corresponding AP, from the wireless AP. The information on the UPnP device may be stored in a database within the wireless AP or may be stored or managed in a separate server.

In operation 310, the wireless AP receives UPnP device multicast notify information from a UPnP device subscribing to an infrastructure network, and identifies a UPnP device description address (hereinafter, referred to as a 'description address') based on the UPnP device multicast notify information. In operation 311, the wireless AP sends a request for a UPnP device description XML and, in operation 313, receives the UPnP device description XML to identify and store a presentation page. The description XML is an XML expression of information on a UPnP device.

Through this, the wireless AP is able to identify information on a UPnP device through previously configured information when a client accesses the wireless AP. For example, as in FIG. 8A below, the wireless AP is able to identify a friendly name of the UPnP device, a modified date, a changed item, a total item, and the like. When providing a service based on an AP area not associated with a UPnP device, the wireless AP does not send a presentation URL, but sends an address (URL) identified through a service name server and, through this URL, a client is able to display an expression of FIG. 8B below.

A presentation URL included in a beacon message has no restriction of length, so a long URL generally uses a storage space of many bits. Accordingly, the present invention uses a hashed URL method in order to map a URL to one-byte space available in the standard beacon message of an existing AP. This method is a scheme of mapping the URL using a hash key, if there is an access to a domain of a URL generated by a provider providing a shortened URL. This method makes it possible to express, by eight (8) bits, an address of a URL as in Table 1 below.

TABLE 1

| Original URL | Shortened URL |
| --- | --- |
| www.samsung.com/sec/upnpdevice-control-digitalmediaserver | http://surl.kr/1fnH |

A shortened URL of Table above belongs to a reserved data ('more data') region of a Wireless Fidelity (WiFi) beacon frame region, and is configured as in FIG. 4 below.

Figure 4:
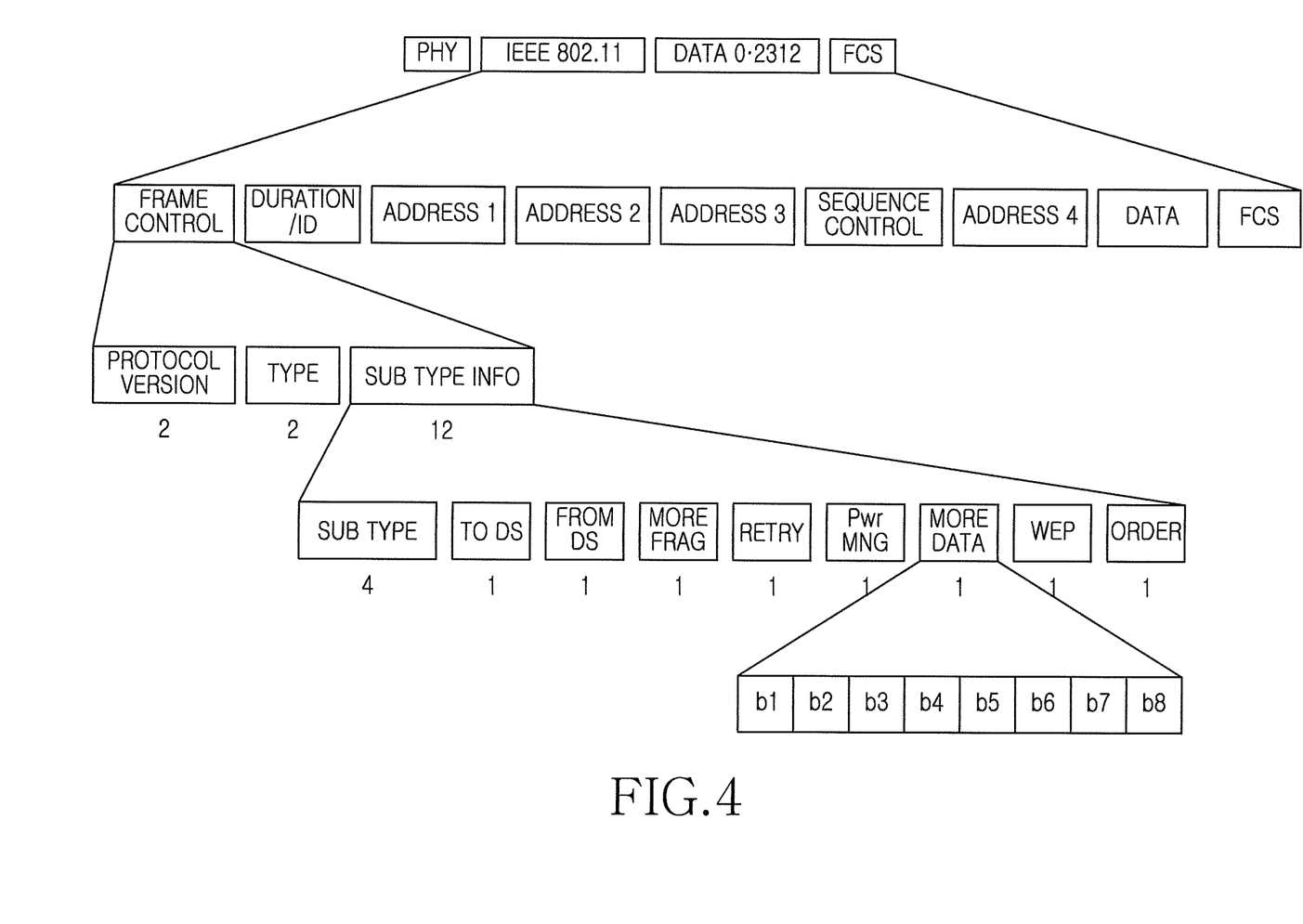
FIG. 4 is a diagram illustrating an Institute of Electrical and Electronics Engineers (IEEE) 802.11 frame structure according to an embodiment of the present invention.

FIG. 4 illustrates an Institute of Electrical and Electronics Engineers (IEEE) 802.11 frame structure according to an embodiment of the present invention.

Referring to FIG. 4, shortened URL information is included in a reserved data ('more data') region of a portion corresponding to a beacon frame region among the IEEE 802.11 frame structure.

Figure 5:
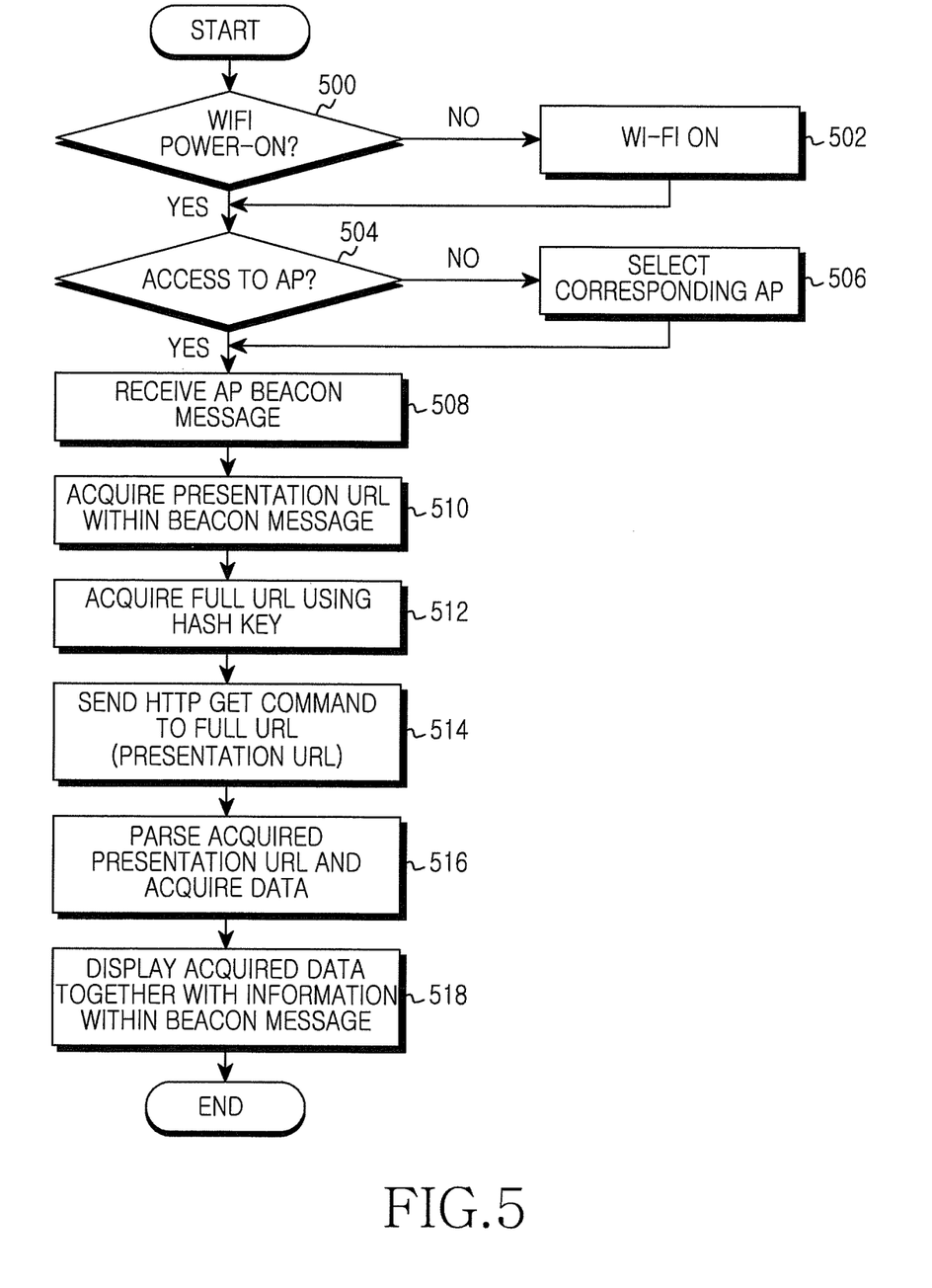
FIG. 5 is a flowchart illustrating an operation of a client terminal for an information push service based on a wireless LAN AP according to an embodiment of the present invention.

FIG. 5 is a flowchart illustrating an operation of a client terminal for an information push service based on a wireless LAN AP according to an embodiment of the present invention.

Referring to FIG. 5, in block 500, the client terminal determines whether it is in a power-on or power-off state. If the client terminal is in a power-off state, the client terminal proceeds to block 502 and performs power-on and proceeds to block 504.

If the client terminal accesses a corresponding AP in block 504, the client terminal proceeds to block 508. Whereas if not accessing the corresponding AP, the client terminal proceeds to block 506 and selects a corresponding AP through a scanning procedure.

After that, in block 508, the client terminal connects to either a URL linked with information on an AP area or an AP, and receives a beacon message including a presentation URL linked with information on UPnP devices from the accessed AP. According to implementation, the beacon message may include the URL linked with the information on the AP area instead of the presentation URL linked with the information on the UPnP devices. According to another implementation, the beacon message may include all of the presentation URL linked with the information on the UPnP devices and the URL linked with the information on the AP area.

After that, in block 510, the client terminal acquires shortened presentation URL information within the beacon message. In block 512, the client terminal deciphers the shortened presentation URL using a hash key, thereby acquiring a full presentation URL.

Next, in block 514, the client terminal sends a HyperText Transfer Protocol (HTTP) Get command to the AP, based on the full presentation URL, in order to acquire information on a corresponding AP area or information on an UPnP device connecting to the AP.

After that, in block 516, the client terminal parses the acquired full presentation URL to acquire the information on the corresponding AP area or the information on the UPnP device connecting to the AP.

Next, in block 518, the client terminal displays the acquired information on the corresponding AP area or the acquired information on the UPnP device connecting to the AP, together with information within the beacon message.

Figure 8A:
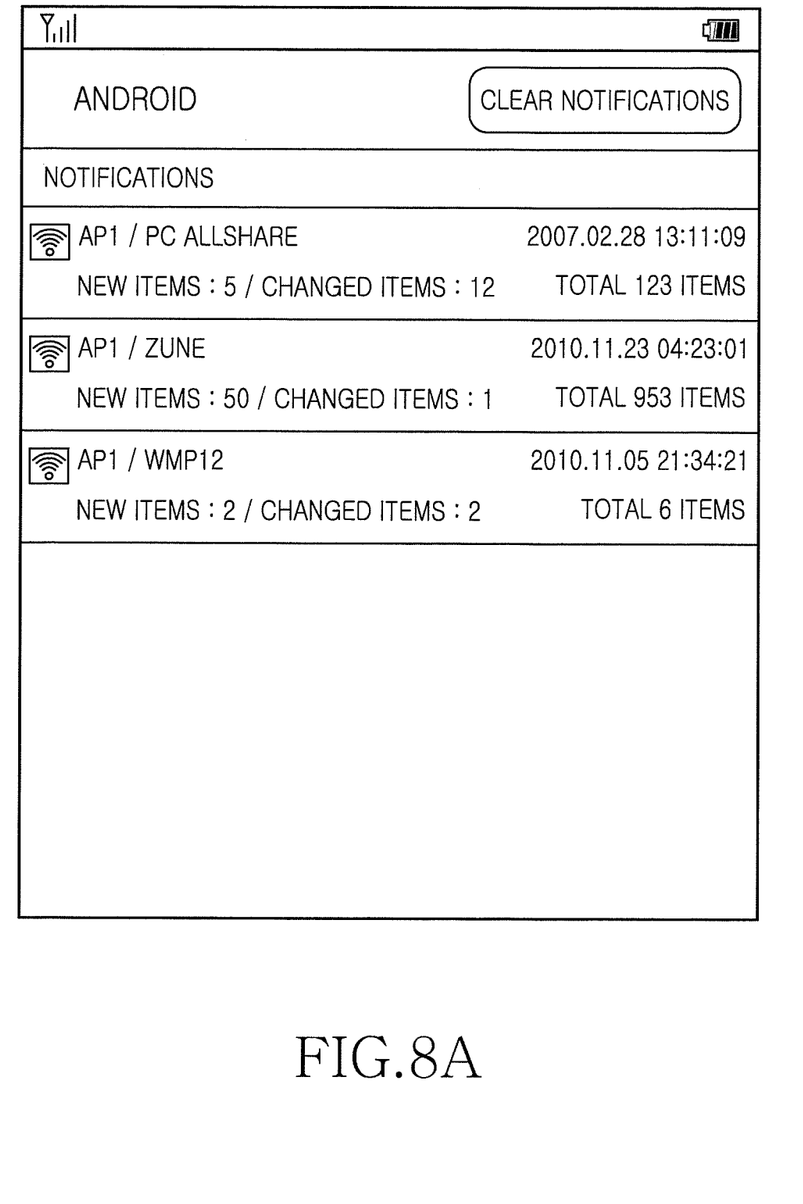
FIGS. 8A through 8C illustrate a screen of an information push service based on a wireless LAN AP according to an embodiment of the present invention.

For instance, referring to FIG. 8A, the client terminal displays, through a corresponding application, information acquired from a page linked to the presentation URL and partial or full information within the beacon message. The client terminal displays each of a plurality of APs and displays a friendly name of a UPnP device connecting to the displayed AP, a modified date, a changed item, a total item, and the like.

Figure 8B:
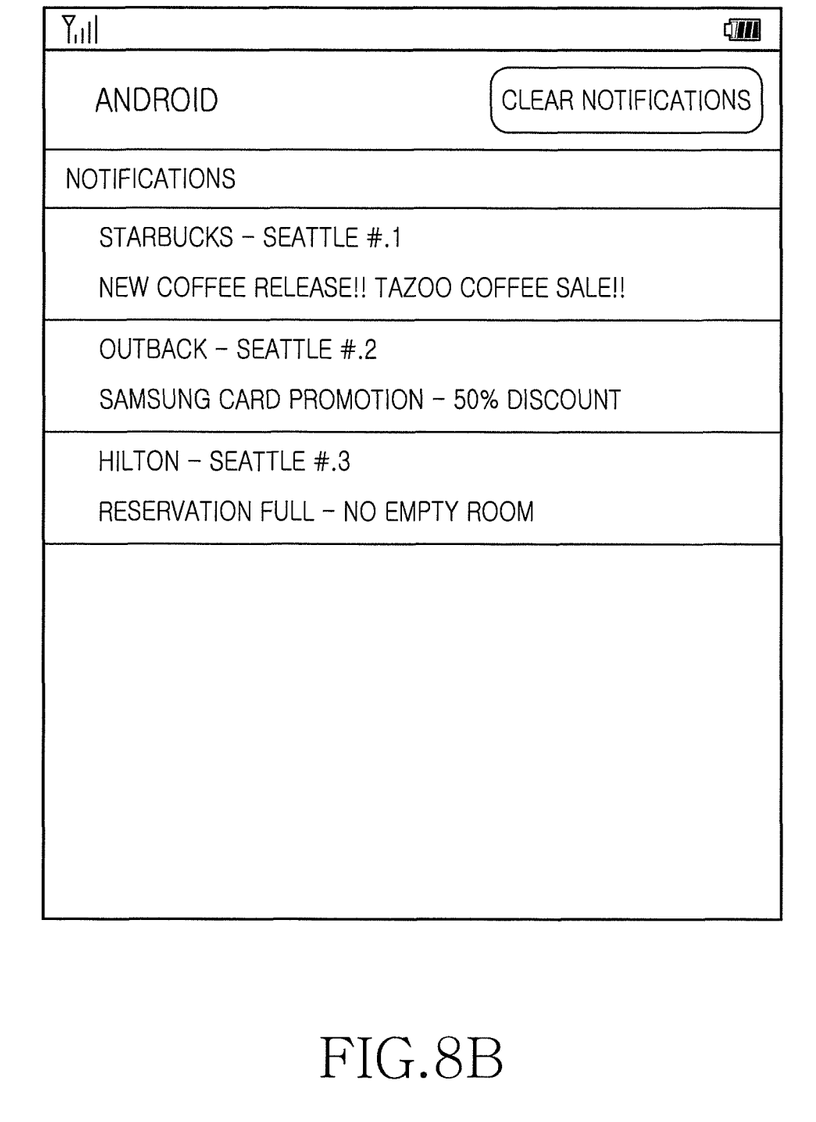

According to implementation, when providing information on an AP area not associated with the UPnP device, referring to FIG. 8B, the client terminal displays the acquired information on the AP area through a corresponding application based on not a presentation URL but an address (URL) identified through a service name server. The client terminal displays simple information on the Starbucks, the Outback, and the Hilton hotel located within a corresponding AP and the like. Here, the Starbucks, the Outback, and the Hilton hotel may be linked with corresponding homepages, respectively.

Accordingly, a user may select an item linked with a corresponding homepage in order to view desired information on the item in detail on a screen of FIG. 8B. For instance, if the user clicks a Starbucks item on the screen of FIG. 8B, the user may identify information on the Starbucks located in a corresponding AP.

Figure 8C:
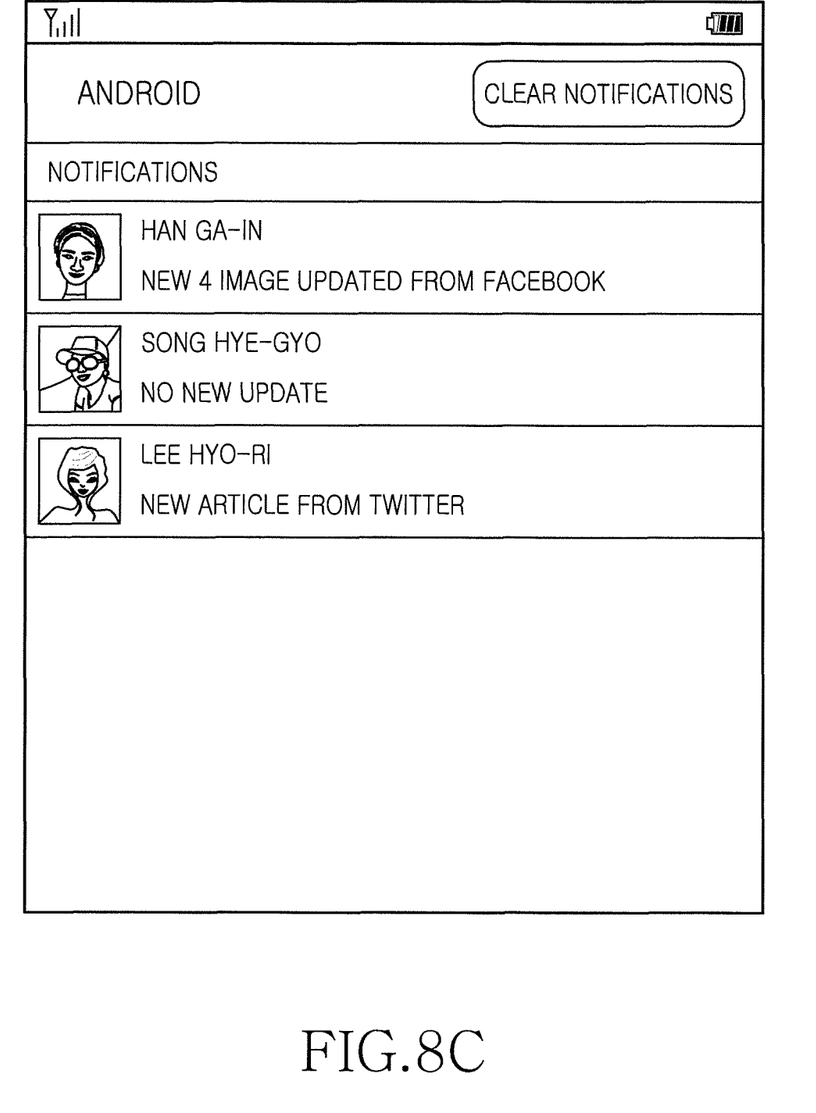

According to another implementation, as in FIG. 8C, in an embodiment where a client terminal is a mobile softAP playing an AP role, the client terminal lists and shows personal homepage information on mobile SoftAP users searched around the client terminal. A user of the client terminal may link items listed on the screen of FIG. 8C, with the user's own personal homepage.

Figure 6:
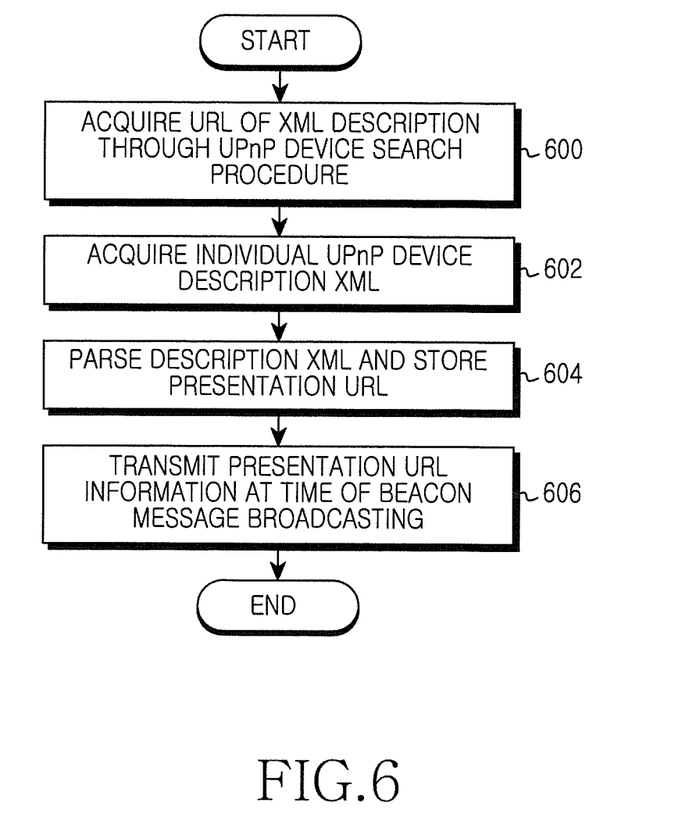
FIG. 6 is a flowchart illustrating an operation of an AP for an information push service based on a wireless LAN AP according to an embodiment of the present invention.

FIG. 6 illustrates an operation of an AP for an information push service based on a wireless LAN AP according to an embodiment of the present invention.

Referring to FIG. 6, in block 600, the AP acquires a URL of an XML description through an UPnP device search procedure and, in block 602, acquires a description XML for an individual UPnP device.

After that, in block 604, the AP parses the description XML and stores a list of presentation URLs.

Next, in block 606, the AP transmits presentation URL information at the time of periodical beacon message broadcasting.

Figure 7:
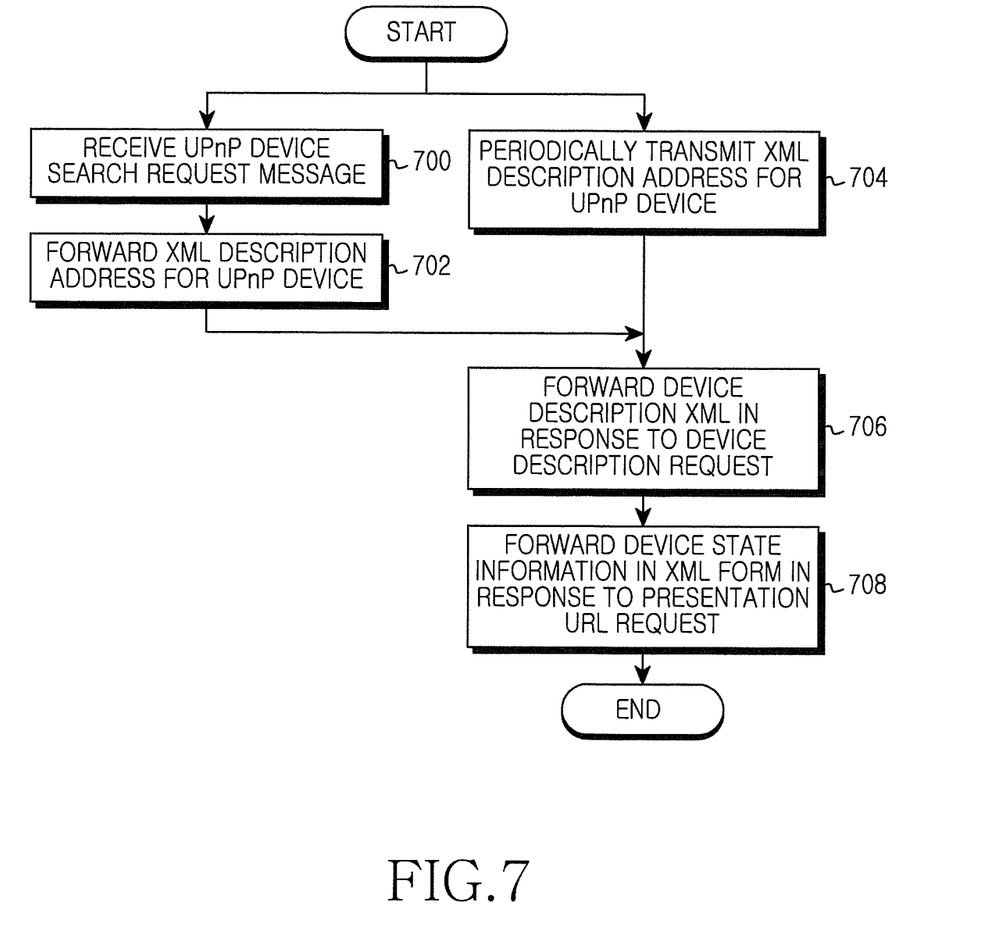
FIG. 7 is a flowchart illustrating an operation of a Universal Plug and Play (UPnP) device for an information push service based on a wireless LAN AP according to an embodiment of the present invention.

FIG. 7 is a flowchart illustrating an operation of an UPnP device for an information push service based on a wireless LAN AP according to an embodiment of the present invention.

Referring to FIG. 7, in block 700, the UPnP device receives an UPnP device search request message from an AP. In block 702, the UPnP device forwards an XML description address for the UPnP device to the AP.

According to implementation, in block 704, the UPnP device may periodically transmit an XML description address for the UPnP device to forward the XML description address to the AP.

After that, in block 706, the UPnP device forwards a UPnP device description XML in response to a UPnP device description request of the AP.

Next, in block 708, the UPnP device forwards UPnP device state information in an XML form in response to a presentation URL request.

FIGS. 8A through 8C illustrate screens displaying an information push service based on a wireless LAN AP according to an embodiment of the present invention.

In FIG. 8A, a mobile device displays information on a UPnP device connecting to one of an AP1 and an AP2, based on presentation URL information included in a beacon message. That is, the mobile device displays information on UPnP devices of the names of 'PC AllShare' and 'Zune' connecting to the AP1 and a UPnP device of the name of 'WMP12' connecting to the AP2.

In FIG. 8B, the mobile device displays information on the Starbucks, the Outback, and the Hilton hotel existing in a corresponding AP area, based on URL information of AP area information included in a beacon message of a corresponding AP. Here, the Starbucks, the Outback, and the Hilton hotel may be located in different APs, or may exist within one AP.

In FIG. 8C, the scenario of the present invention is applicable even to a mobile SoftAP in which a mobile device plays an AP role itself, and even a scenario capable of broadcasting a personal homepage (or a Social Network Service (SNS) service) of a SoftAP user is possible.

Figure 9:
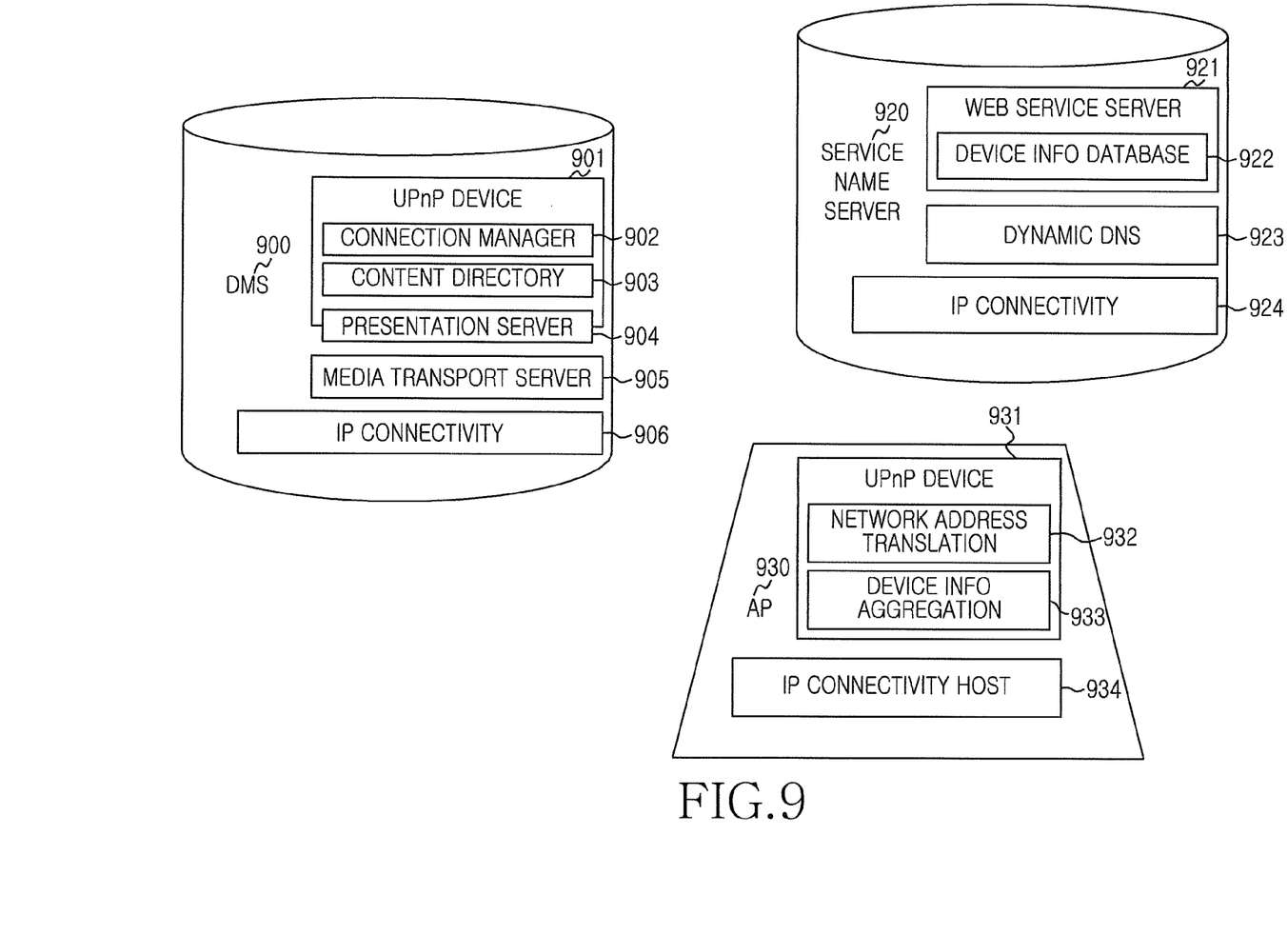
FIG. 9 is a diagram illustrating a system for an information push service based on a wireless LAN AP according to an embodiment of the present invention.

FIG. 9 illustrates a system for information a push service based on a wireless LAN AP according to an embodiment of the present invention.

Referring to FIG. 9, a DMS 900 of a DLNA includes a UPnP device block 901 for performing a UPnP function, a media transport server block 905 taking charge of media data transport, and an IP connectivity block 906 providing connection with an AP. Here, the UPnP device block 901 for performing the UPnP function includes a connection manager 902 managing UPnP connection, a content directory 903 managing a contents directory, and a presentation server block 904 managing/storing a presentation URL.

That is, the DMS 900 playing a server role is constructed in a form of adding a server of a presentation function in an existing UPnP device service. The presentation server plays a role equivalent or similar to an HTML server, and a corresponding page displays an HTML construction of a newly changed item (e.g., an MPEG Player 3 (MP3) file and media data such as a moving picture) and summary of the DMS.

An AP 930 includes a UPnP device block 931 for performing a UPnP function and an IP connectivity host block 934 for providing IP connectivity to a device equipped with a wireless LAN card. Here, the UPnP device block 931 includes a Network Address Translation (NAT) block 932 for common IP and private IP mapping, and a device information aggregation 933 for storing presentation page information.

That is, the AP 930 uses a module for storing presentation page information according to the present invention in addition to a general Dynamic Domain Name Service (DDNS) function, and uses a NAT device for common IP and private IP mapping.

A Service Name Server (SNS) 920 includes a Web service server block 921, a DDNS block 923, and an IP connectivity block 924 for providing connectivity. Here, the Web service server block 921 also includes a device information database for managing device information. The SNS 920 is a server used when providing a Web service based on an area not a general DLNA device. When a client accesses the AP 930, the AP 930 provides a link of a corresponding server address to a beacon message and, through the link, the client may receive a Web service of a corresponding area before accessing the AP 930.

As described above, when a client terminal attempts initial access to an AP or executes a handover to other AP, the client terminal receives, from the AP, a push of information considering a regional characteristic of the AP or information on a UPnP device connecting to the AP, thereby being able to allow a user to simply, conveniently, and easily acquire and utilize peripheral information of an area in which the user is located, and also provides a service based on information on a position of contents, thereby allowing the user to easily access the contents.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A method in a mobile station, the method comprising:
   in response to entering at least one access point (AP) connection coverage, receiving beacon information including a presentation Uniform Resource Locator (URL) from the (AP);
   obtaining the presentation URL from the beacon information;
   obtaining information associated with at least one peripheral device accessing the AP based on the presentation URL; and
   displaying the information obtained based on the presentation URL.

2. The method of claim 1, wherein obtaining the information comprises:
   restoring the presentation URL included in the beacon information, wherein the presentation URL is a shortened URL;
   requesting information linked to the presentation URL;
   obtaining a presentation page associated with the at least one peripheral device as eXtensible Mark-up Language (XML); and
   obtaining the information by parsing the presentation page.

3. The method of claim 1, wherein the information further includes information associated with a regional characteristic of the AP.

4. A method in an access point (AP), the method comprising:
   obtaining information associated with a peripheral device from at least one peripheral device accessing the AP;
   generating beacon information including a presentation Uniform Resource Locator (URL) based on the obtained information;
   broadcasting the beacon information including the presentation URL to a mobile station; and
   in response to a request for information based on the presentation URL from the mobile station, transmitting the information associated with the at least one peripheral device accessing the AP to the mobile station.

5. The method of claim 4, wherein the presentation URL is shortened by a hash algorithm.

6. The method of claim 4, wherein the information further includes information associated with a regional characteristic of the AP.

7. The method of claim 4, wherein the information is generated based on eXtensible Mark-up Language (XML).

8. The method of claim 4, further comprising:
   receiving the presentation URL comprising a URL for description XML of a peripheral device from the at least one peripheral device;
   receiving the description XML, based on the presentation URL; and
   configuring a presentation page for the peripheral device based on the description XML.

9. The method of claim 8, further comprising storing a URL of a presentation page for the peripheral device.

10. A method in a peripheral device, the method comprising:

transmitting, periodically by the peripheral device to an access point (AP) to which the peripheral device is connected, a message including a URL for description eXtensible Mark-up Language (XML) of the peripheral device; and transmitting the description XML based on the URL to the AP, wherein the description XML includes information associated with the peripheral device accessing the AP, and the information includes a friendly name, a modified data, a changed item, and total items of the peripheral device.

11. A mobile station comprising:

a receiver configured to receive beacon information from at least one access point (AP);

a display configured to display information associated with at least one peripheral device accessing the AP and information associated with the AP; and a controller configured to:
in response to entering at least one AP connection coverage, receive the beacon information including a presentation Uniform Resource Locator (URL) from the AP;
obtain the presentation URL from the beacon information;
obtain information associated with the at least one peripheral device accessing the AP based on the presentation URL; and
display the information obtained based on the presentation URL.

12. The mobile station of claim 11, wherein the controller is further configured to:
restore the presentation URL included in the beacon information, wherein the presentation URL is a shortened URL;
request information linked to the presentation URL;
obtain a presentation page associated with the at least one peripheral device as eXtensible Mark-up Language (XML); and
obtain the information by parsing the presentation page.

13. The mobile station of claim 11, wherein the information further includes information associated with a regional characteristic of the AP.

14. An access point (AP) comprising:

a controller configured to:
obtain information associated with a peripheral device from at least one peripheral device accessing the AP,
generate beacon information comprising a presentation Uniform Resource Locator (URL) based on the obtained information,
broadcast the beacon information comprising the presentation URL to a mobile station, and
in response to a request for information based on the presentation URL from the mobile station, transmit the information associated with the at least one peripheral device accessing the AP to the mobile station.

15. The AP of claim 14, wherein the presentation URL is shortened by a hash algorithm.

16. The AP of claim 14, wherein the information further includes information associated with a regional characteristic of the AP.

17. The AP of claim 14, wherein the information is generated based on eXtensible Mark-up Language (XML).

18. The AP of claim 14, wherein the controller is further configured to:
receive the presentation URL comprising a URL for description XML of a peripheral device from the at least one peripheral device;
receive the description XML based on the presentation URL; and
configure a presentation page for the peripheral device based on the description XML.

19. The AP of claim 18, wherein the controller stores a URL of the presentation page for the peripheral device.

20. A peripheral device comprising:

a controller configured to periodically transmit, to an access point (AP) to which the peripheral device is connected, a message including a URL for description eXtensible Mark-up Language (XML) of the peripheral device, and transmit the description XML based on the URL to the AP, wherein the description XML includes information associated with the peripheral device accessing the AP, and the information includes a friendly name, a modified date, a changed item, and total items of the peripheral device.

* * * * *